United States Patent Office 3,555,691
Patented Jan. 19, 1971

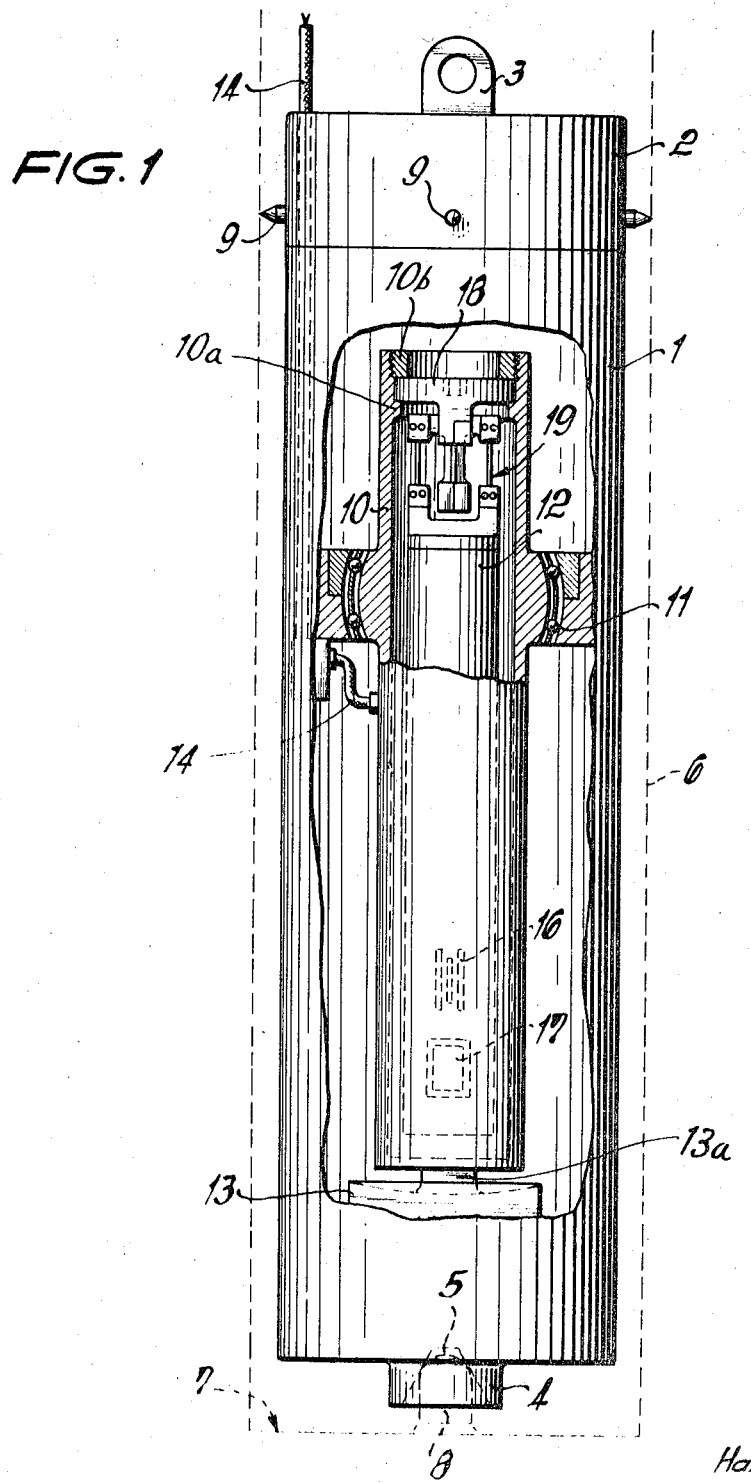

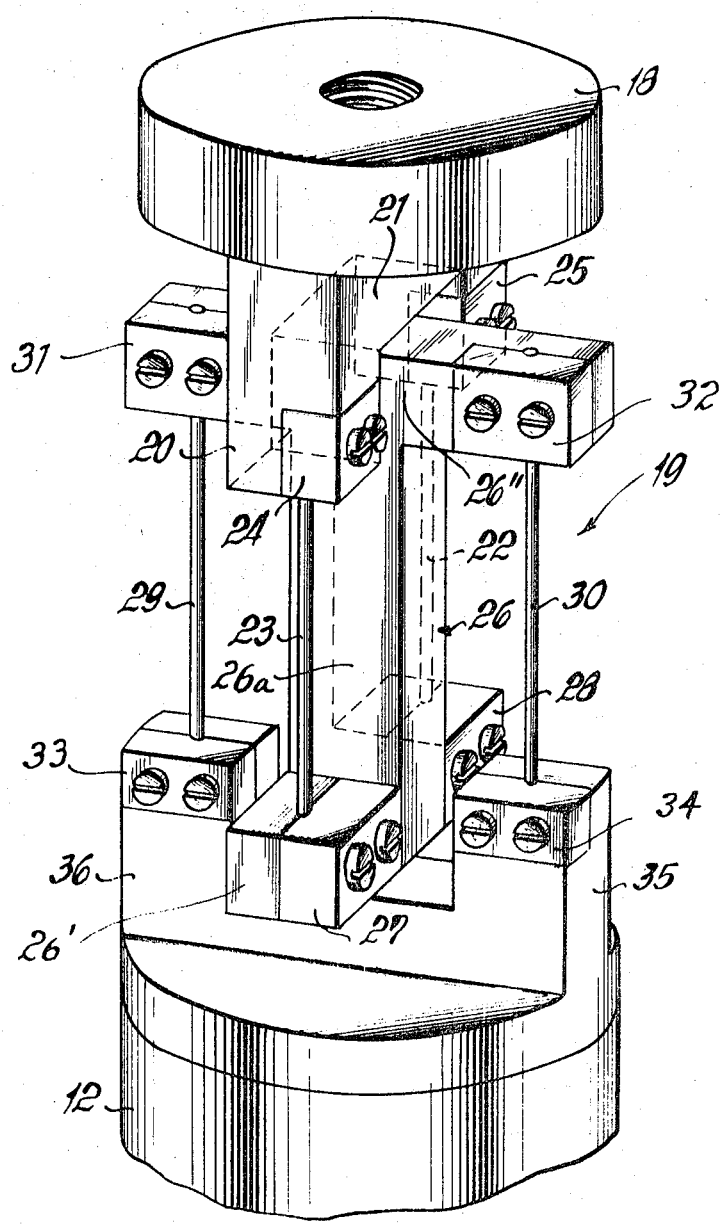

3,555,691
CLINOMETRIC PENDULUM APPARATUS
Hans-Dieter Jacoby, Berlin, Germany, assignor to Continental Elektroindustrie Aktiengesellschaft Askania Werke, Berlin, Germany, a corporation of Germany
Filed Jan. 22, 1968, Ser. No. 699,422
Claims priority, application Germany, Jan. 28, 1967, C 15,625
Int. Cl. E21b *47/02;* G01c *9/16*
U.S. Cl. 33—205                                   4 Claims

ABSTRACT OF THE DISCLOSURE

A clinometric pendulum is provided with a pendulum body suspended vertically by two pairs of spaced normally straight flexible wires of round cross section.

---

The present invention relates to clinometric devices and more particularly to pendulum apparatus for sensitive clinometric measurements. It constitutes an advance over that disclosed in Pat. 3,238,631, the disclosure of which is incorporated herein by reference, and is useful in like manner thereto but with better effect.

In known clinometers the means by which a pendulum body is vertically suspended includes a pair of spaced leaf springs extending from a fixed support to the pendulum body. The leaf springs are arranged parallel to each other and in a common plane. The pendulum body suspended in this manner is enabled to incline about a given pivotal axis, which may be visualized as interconnecting the regions of flexing of the two leaf springs.

Such leaf spring suspensions may be designed to have an extremely small directional moment, which may be so small to be nearly zero. However, this type of suspension often has the disadvantage that internal stress of the material from which the springs are made prevents continuity in the flexing of the springs in the zero position of the pendulum. Instead, the flexing takes place discontinuously and in jumps, with the result that the zero position becomes unstable.

The undesirable results just described are aggravated if the individual springs are inaccurately clamped into the supporting structure and if the orientation of the two springs deviates even slightly from their ideal positioning in the common plane. Even more troublesome are the corresponding effects in such suspension of a pendulum body utilizing a second pair of similar leaf springs in a plane perpendicular to the plane of the first pair of springs, thereby providing mutually perpendicular pivotal axes for inclination of the pendulum body with two degrees of freedom.

A principal object of the present invention is, therefore, provision of an improved clinometric pendulum free of the described disadvantages.

Another object of this invention is the provision of new, improved supporting arrangement for a pendulum body in clinometric devices, giving the pendulum body two degrees of freedom for rotation.

Other objects of the invention, together with means and methods for attaining the various objects, will become apparent from the following description and the accompanying diagrams of a preferred embodiment of the device of the invention, which is especially suited for sensitive measurements of deviations in direction of the earth's gravitational field.

In general, the objects of the invention are achieved, in a pendulum comprising a vertically suspended pendulum body by means of normally straight flexible wires of round cross section. Two pairs of such wires are arranged such that the wires in each pair are spaced apart from but alongside and substantially parallel to one another and substantially parallel to and flanking the longitudinal axis of the pendulum body, the wires in each pair being located in a common plane, the two planes so defined being mutually perpendicular.

FIG. 1 is a schematic side elevation, partially in section, of such a device of this invention;

FIG. 2 is a more detailed schematic perspective representation of the supporting arrangement for the pendulum body therein.

In accordance with the foregoing, the invention provides a vertically suspended pendulum of the above described kind, characterized by the employment of resilient wires of round cross section as the supporting means therefor. It was surprisingly found that such flexible members having a round cross section, especially when characterized by very slight recovery forces when deformed, are essentially free of the above described undesirable effects, or exhibit them only to a negligible degree. Another benefit of the new suspension, comprising these flexible round wires, comes from a permissible reduction in the degree of accuracy required in the manufacture of the supporting assembly for the pendulum body, resulting in increased manufacturing economy. Above all, in the new type of suspension of the present invention, the previously exact orientation of the clamps or other fastening means for the ends of the wires is not a requisite.

FIG. 1 shows, from the side and partly broken away to reveal the interior, hollow cylindrical housing 1, which is made of metal. This housing comprises head member 2 and eye member 3 connected thereto for receiving means for suspending the housing, as by a cable or the like (not shown) optionally provided with a releasable clamp or similar holding means. Bottom member 4 of housing 1 has central frusto-conical recess 5 in its lower outside surface.

Housing 1 is designed to be brought down into a bore hole having a cylindrical wall lined by pipe or the like, such as to a depth of 30 meters to 50 meters. The housing is lowered into bore hole 6 (indicated by broken lines in FIG. 1) by means of such a suspending cable or the like all the way to the bottom 7 of the bore hole, which is provided with upstanding pin 8, such as frusto-conical recess 5 of bottom member 4 engages on pin 8, which assures centered positioning of the housing in the bore hole, whereupon the releasable holding means may be withdrawn from eye member 3 and the suspending cable be removed from the bore hole for further use.

Head member 2 of housing 1 also comprises several equally spaced pointed pins 9, shown projecting outwardly from its circumferential surface in FIG. 1, but which are temporarily retracted into the housing 1 while the housing is lowered into the bore hole and are pushed radially outwardly from the head member when the housing comes to rest on upstanding pin 8 at the bottom of the bore hole. The internal mechanism for controlling the retraction and extension of pins 9 is not shown but is controlled by the weight of the device acting on eye member 3 during suspension of the housing and by means of appropriate lever means holding the pins retracted. When the housing comes to rest on upstanding pin 8, the weight thereof no longer is supported by eye member 3, thereupon permitting the pins 9 (which may be spring-biased, if desired) to project outwardly against the inside wall of the bore hole and thereby lock the housing securely in place therein.

Housing 1 contains shell-like cylindrical pendulum housing 10, which is pivotally mounted in precision ball-bearing assembly 11 (shown sectioned in FIG. 1) affixed to the inner wall of housing 1. This allows pendulum housing 10 universal movement about a central point located on the longitudinal axis of housing 1. Elongated pendulum housing 10 encloses pendulum body 12, which is actually used for the clinometric measurements. Pendulum housing 10 is provided at its bottom end with arresting mechanism, which may include stop means 13a adapted for frictional contact with coacting fixed means 13 upstanding from the bottom of housing 1, to permit arresting of pendulum housing 10 in any desired position. The actuation of the arresting mechanism, which may conveniently be electromagnetic in nature, is effected through cable 14 with the aid of electrical remote control means provided above ground. Thus, a solenoid may be employed to lift the stop means out of contact with the coacting means, so as to permit the pendulum housing to be reoriented substantially in alignment with the direction of the earth's gravitational field, and then inactivated to permit the stop means to drop (or be spring-biased) into essentially non-slipping contact with the coacting means.

Pendulum body 12 is suspended in pendulum housing 10 by means of pendulum suspension assembly 19, which in turn is supported and held therein by head plate 18 of the pendulum housing. Head plate 18 rests on an internal shoulder 10a near the top of the pendulum housing and is retained there by plug 10b threaded into that top end. Details of the pendulum suspension assembly appear in the next view.

FIG. 2 shows that head plate 18 of the pendulum body 10 is provided at its underside with two spaced downwardly projecting members 20 and 21 extending parallel to the longitudinal axis of pendulum housing 10. These two projecting members hold the respective upper ends of normally straight flexible wires 22 and 23, which are fastened thereto removably by help of respective clamp means 24 and 25, tightened onto projections 20 and 21, respectively, by screws. The lower ends of wires 22 and 23 are fastened to bottom cross-bar 26' of central structural member 26 by help of respective clamp means 27 and 28, the latter being likewise secured to structural member 26 by screws.

Central structural member 26 also comprises an upright or columnar component 26a, behind which other components are indicated in broken lines in FIG. 2. Upright component 26a has at its top end upper crossbar 26", which is free of contact with the underside of head plate 18 and is freely movable between projecting member 20 and projecting member 21. The free ends of cross-bar 26" are fastened, by clamp means 31 and 32 held by screws, to the upper ends of two additional normally straight flexible wires 29 and 30, respectively, having likewise a round cross-section. The lower ends of these wires 29 and 30 are fastened to pendulum body 12 by clamp means 33 and 34, respectively, held by screws to spaced upright projections 35 and 36 provided at the top end of pendulum body 12. The wires in each pair flank an imaginary central line representing the upwardly projected longitudinal axis of the pendulum body.

The center of gravity of pendulum body 12 is located below pendulum suspension assembly 19 so that all four supporting wires, 22, 23, 29, and 30, are subjected only to tensile forces. Pair of wires 22 and 23 are located in a plane, and 29 and 30 also are located in a plane, the respective planes being perpendicular to each other and substantially vertical. The wires are normally straight but so flexible that they exert upon the pendulum body 12 very slight directional moment when the head plate 18 is inclined with respect to the horizontal plane. The pendulum body 12 will accordingly always assume an equilibrium position essentially in the direction of the gravitational force and independent of the inclination of head plate 18 with respect to the horizontal plane. Reorientation of the pendulum body 12 is effected by pivoting of the pendulum body around the two mutually perpendicular pivotal axes that may be visualized as connecting the points of maximum flexing of the respective pairs of wires 22 and 23, and 29 and 30. A line connecting these two points is contained in the plane defined by the two wires. The same applies by analogy to the other pair of wires 22 and 23, whereby a line connecting the points of maximum flexing of this latter pair of wires is contained in the plane defined by these two wires. Accordingly, the connecting line of the points of maximum flexing of the former pair of wires intersects in a point with the connecting line of the points of maximum flexing of the latter pair of wires. This point is the pivotal point of pendulum body 12.

Suitable materials for the wires fulfilling the above conditions include, certain metals and alloys of one or more of such metals, as will be apparent to persons having ordinary skill in the art, in the light of the present teaching. A modulus of rigidity amount to less than about $3 \times 10^{11}$ dynes per square centimeter, and Young's modulus less than $10^{10}$ dynes per square centimeter are considered to be acceptably small for such suitable materials.

The inclination of the pendulum body 12 with regard to the reference plane parallel to head plate 18, or perpendicular to the longitudinal axis of pendulum housing 10, is preferably measured electrically. For this purpose the device may advantageously be provided with two mutually perpendicular electrical sensors 16 and 17 arranged on the inside of pendulum housing 10 and cooperating with pendulum body 12. The corresponding measured data are transmitted over cable 14 to the surface of the earth, where they may be recorded. The sensors are indicated (in broken lines) schematically at 16 and 17 in FIG. 1 and may be, for instance, conventional devices operating on the principle of measurement of electrical capacitance.

For the use of the pendulum and for carrying out the desired measurements, the device is lowered into the bore hole 6 all the way to the bottom, so that housing 1 rests by recess 5 on pin 8 in the bottom of the bore hole and housing 1 is centered and its position fixed by pins 9 as described hereinbefore. Thereafter, arresting of means 13, 13a is released, so as to permit free movement of pendulum housing 10 in its ball-bearing mount 11. The pendulum housing 10 adjusts thereby approximately in the direction of the earth's gravitational field, certain small deviations therefrom being unavoidable because of residual frictional resistance and inaccuracy of bearing 11. Pendulum housing 10 is then arrested in its position by action of the arresting mechanism. Thereafter, the relative positions of pendulum body 12 with respect to pendulum housing 10 may be recorded above ground as a function of time with the aid of electrical sensors 16 and 17. The position of the sensitive pendulum body 12 indicates at each moment any deviation in the direction of the earth's gravitational field with respect to the initial approximate orientation.

In another embodiment of the pendulum of the present invention, flexible spring wires (having likewise a round cross section) in which the elastic recovery forces are not so small, may be substituted for wires 22, 23, 29, and 30. Suitable materials for the spring wires in this embodiment of the pendulum include, for instance, copper, palladium, and platinum, also certain alloys of one or more of the foregoing, such as beryllium bronze. In this case, the pendulum body 12 does not line itself up essentially with the direction of the earth's gravitational field when the head plate 18 is inclined with respect to the horizontal plane, but achieves a different equilibrium position dependent on the degree and direction of the inclination and on the magnitude of the elastic recovery forces of the springs. This composite, intermediate position is desirable in certain situations. In this embodiment of the pendulum device of the invention, the pendulum body 12 may, for instance, be used for the directional control of bundles of light rays, e.g., of reflected light, or other radiation. The pendulum body may in this instance serve as the carrier for an optical element, which is placed or included in the path of a bundle of light rays and which is adapted to influence the direction or other physical characteristic thereof.

In another embodiment of the pendulum of the present invention, the ends of the wires used for the suspension of the pendulum body may be fastened by adhesives or the like in a small sleeve or a similar structure or they may be joined in a sleeve by soldering, etc. The sleeves, with the ends of the wires contained therein, may then be fastened to or clamped into the respective structural members of the suspension assembly 19 as described hereinbefore.

In addition to the preferred embodiment shown and described in detail, and the suggested variation therefrom also mentioned above, other modifications may be made, as by adding, combining, or subdividing parts, while retaining at least some of the benefits and advantages of the invention, which is defined in the following claims.

What is claimed is:

1. A sensitive, vertically suspended clinometric pendulum device, particularly adapted for use in bore holes for measuring deviations in the direction of the earth's gravitational field, and comprising a pendulum body and a suspension assembly for said pendulum body, wherein the pendulum body is suspended by two pairs of spaced flexible members, each having the form of resilient, round cross section wires, such that the pendulum body is pivotable around two mutually perpendicular pivotal axes, each of which is formed by the line connecting the loci of maximum flexing of the respective spaced flexible members in a given pair thereof, wherein the suspension assembly is supported by additional pendulum means, contained in common housing means, and includes means for releasably fixing the position of the additional pendulum means in relation to the common housing means.

2. A sensitive, vertically suspended clinometric pendulum device, particularly adapted for use in bore holes for measuring deviations in the direction of the earth's gravitational field, and comprising a pendulum body and a suspension assembly for said pendulum body, wherein the pendulum body is suspended by two pairs of spaced flexable members, each having the form of resilient, round cross section wires, such that the pendulum body is pivotable around two mutually perdendicular pivotal axes, each of which is formed by the line connecting the loci of maximum flexing of the respective spaced flexible members in a given pair thereof, wherein the suspension assembly is supported by additional pendulum means, contained in common housing means, and includes means for releasably fixing the position of the additional pendulum means in relation to the common housing means, and the common housing means comprises means for fixing the position of the housing means in relation to the bore hole in which the pendulum device is located.

3. Clinometric pendulum apparatus comprising an external housing including means for fixing the position of the external housing in a bore hole, an internal housing universally mounted in the external housing, the respective housings having coacting means for arresting motion of the internal housing with respect to the external housing, and inside the internal housing a pendulum body having a longitudinal axis, and suspension means therefor supported from the internal housing, the suspension means comprising a first pair of flexible, normally straight wires spaced apart but alongside and substantially parallel to one another, flanking and substantially parallel to the longitudinal axis of the pendulum body, a columnar member affixed to the lower ends of the first pair of wires by means of an interconnecting first cross-bar, a second pair of flexible, normally straight wires spaced apart but alongside and substantially parallel to one another, flanking and substantially parallel to the longitudinal axis of the pendulum body, the columnar member being affixed to the upper ends of the second pair of wires by means of an interconnecting second cross-bar, and the pendulum body being affixed to the lower ends of the second pair of wires.

4. Clinometric pendulum apparatus comprising an external housing including means for fixing the position of the external housing in a bore hole, an internal housing universally mounted in the external housing, the respective housings having first and second stop means coacting to arrest motion of the internal housing with respect to the external housing, and inside the internal housing a pendulum body having a longitudinal axis and suspension means therefor supported from the internal housing, including means for disengaging the coacting stop means and wherein the latter are biased into mutual frictional engagement by gravity and the first stop means depends from the internal housing and is mounted thereon and operatively connected to the disengagement means for movement opposite to the direction in which the first stop means is biased into engagement with the second stop means.

References Cited
UNITED STATES PATENTS

| | | | |
|---|---|---|---|
| 3,238,631 | 3/1966 | Graf | 33—205.5 |
| 2,189,560 | 2/1940 | Culbertson | 33—205.5X |
| 2,190,790 | 2/1940 | Humphreys | 33—205.5X |
| 2,618,156 | 11/1952 | Boucher. | |

LEONARD FORMAN, Primary Examiner

S. L. STEPHAN, Assistant Examiner

U.S. Cl. X.R.

33—215